United States Patent
Patel et al.

(10) Patent No.: US 6,455,664 B1
(45) Date of Patent: *Sep. 24, 2002

(54) CRYSTALLINE POLYESTER RESINS AND PROCESS FOR THEIR PREPARATION

(75) Inventors: Bimal Ramesh Patel; Gary Francis Smith, both of Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,600

(22) Filed: Nov. 20, 2000

(51) Int. Cl.$^7$ ................................................ C08G 63/00
(52) U.S. Cl. ...................... 528/272; 528/279; 528/287; 528/481; 528/491
(58) Field of Search .................. 528/274, 279, 528/287, 307, 481, 491

(56) References Cited

U.S. PATENT DOCUMENTS

| | | |
|---|---|---|
| 2,891,930 A | 6/1959 | Cadwell et al. |
| 2,901,466 A | 8/1959 | Kibler et al. |
| 4,327,206 A | 4/1982 | Winston et al. |
| 5,986,040 A | 11/1999 | Patel et al. |

FOREIGN PATENT DOCUMENTS

EP  0353990 B1  11/1994

*Primary Examiner*—Samuel A. Acquah

(57) ABSTRACT

In a process for producing PCCD polyester of the formula

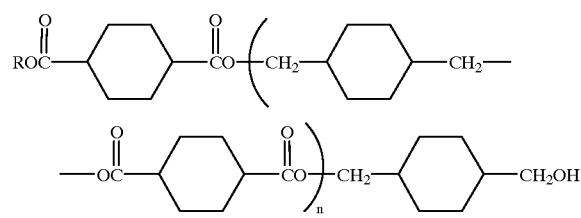

by reacting a starting CHDM and a starting DMCD in the presence of a catalyst to produce an aliphatic alcohol and an acid interchange oligomer and forming a low viscosity PCCD, and reacting the intermediate PCCD by solid state polymerization for increasing the molecular weight of to form a PCCD having melting temperature of about 225 to about 234 degrees Centigrade and a viscosity from about 2,000 to about 20,000 poise.

19 Claims, No Drawings

CRYSTALLINE POLYESTER RESINS AND PROCESS FOR THEIR PREPARATION

FIELD OF THE INVENTION

The invention relates to a polyesters, and more particularly of polyesters derived from cycloaliphatic diols and cycloaliphatic esters and a process for their formation.

BACKGROUND OF THE INVENTION

Poly(1,4-cyclohexylenedimethylene 1,4-cyclohexanedicarboxylate), PCCD, is a known polyester referred to in U.S. Pat. No. 2,891,930 to Caldwell et al and U.S. Pat. No. 2,901,466 to Kibler et al. Kibler et al discusses poly(1,4-cyclohexylenedimethylene 1,4-cyclohexanedicarboxylate) as one of the sixty-eight examples of linear polyesters and polyesteramides. According to Example 42, an excess amount of the glycol or 1,4-cyclohexanedimethanol component is utilized for making poly(1,4-cyclohexylenedimethylene 1,4-cyclohexanedicarboxylate). U.S. Pat. No. 4,327,206 to Winston et al describes the reaction of 1,4-cyclohexanedicarboxylate with aromatic diols.

U.S. Pat. No. 5,986,040 to Patel and Smith describes the production of PCCD having a melting point of the final moldable linear PCCD from 208 to 224 degrees as shown in Table 3 of the Examples.

Typically, molding compositions based upon blends of thermoplastic resin incorporating 1,4-cyclohexanedicarboxylic acid residues in the polymer chain may have good impact resistance, good processability, and transparency. U.S. Pat. No. 5,986,040 to Patel and Smith describes PCCD resins having those properties. Further and additional improvements to the properties, such as thermal capacity, are desirable.

SUMMARY OF THE INVENTION

The present invention is directed to an improved process for producing a moldable linear poly(1,4-cyclohexylenedimethylene 1,4-cyclohexanedicarboxylate), PCCD, resin having crystalline properties with an enhanced melting temperature that makes it suitable for polymer blends. By the improved process, the melting points of the PCCD is enhanced to about 225 to about 234 degrees Centigrade thereby improving the thermal capability and crystallinity of the resin.

Typically, the crystallinity of PCCD, is not as high as that of such commercially available polyesters as poly(1,4-butylene terephthalate), or "PBT" which is an ingredient of many resin blends, such as blends with polycarbonate and other thermoplastic polymers. In addition to imparting desirable molding characteristics, enhanced crystallinity imparts such advantageous properties as its resistance to solvents. Thus, it is desirable to enhance the crystallinity of poly(1,4-cyclohexylenedimethylene 1,4-cyclohexanedicarboxylate) and produce a poly(1,4-cyclohexylenedimethylene 1,4-cyclohexanedicarboxylate) with uniform melting properties which permit its incorporation into thermoplastic blends useful for weatherable molding type applications. Enhanced crystallinity results in a desirable higher melting temperature for a given degree of polymer polymerization.

For sake of clarity, the following Table 1 sets forth the meaning of the abbreviations used throughout the specification.

TABLE 1

Abbreviations

| Abbreviation | Name |
| --- | --- |
| PCCD | 1,4-cyclohexanedicarboxylic acid, polymer with 1,4-cyclohexanedimethanol (9CI Chemical Abstracts Index name); also poly(1,4-cyclohexylenedimethylene 1,4-cyclohexanedicarboxylate) |
| CHDM | 1,4-cyclohexanedimethanol (trans/cis mixture) |
| t-DMCD | dimethyl trans-1,4-cyclohexanedicarboxylate |
| TPT | tetrakis(2-isopropyl)orthotitanate; also titanium(IV) isopropoxide |
| MV | Melt Viscosity |
| $T_m$ | Melting Point |

A linear cycloaliphatic polyester resin consists essentially of a polyester having the formula:

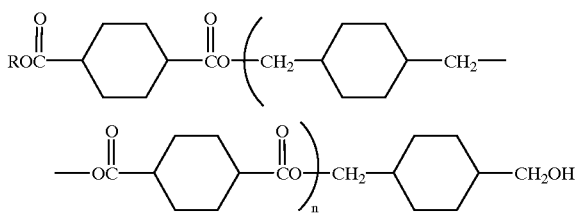

where R is an alkyl from 1 to 6 carbon atoms or residual endgroups derived from either monomer, and n is greater than about 70. The polyester is derived from the transesterification reaction of a starting DMCD and a starting CHDM.

DMCD and CHDM are polymerized to produce a low viscosity polymer intermediate PCCD with a melt viscosity of from about 50 to about 800 poise, preferably from about 200 to about 500 poise.

Next, the low viscosity intermediate is solid state polymerized at a temperature from about 175 C to about 210 C, preferably from about 190 C to about 206 C, to produce a resulting PCCD polymer having a melting temperature, $T_m$, about 225 to about 234 degrees Centigrade having improved thermal capability due enhanced crystallinity of the resin.

The preferred enhanced melt viscosity of the final prepared PCCD is from about 2,000 to about 22,000 poise. For applications for extruding the resulting resin into a sheet form, the preferred melt viscosity is from about 7000 poise to about 22000 poise, and more preferably from about 10000 poise to about 18000 poise. For application for injection molding the resulting resin, the preferred melt viscosity is from about 1000 poise to about 10000 poise and more preferably from about 2000 to about 6000.

The starting CHDM and DMCD are reacted in the presence of a catalyst in an inert atmosphere to form the low viscosity PCCD polymer having ester end groups such as a carboxycyclohexanecarboxylate end group (or ester thereof) and acid or hydroxy end groups such as alkyoxycyclohexanealkyanol end groups. The low viscosity intermediate preferably has hydroxy end group to ester end group present in about a 1 to 1 ratio so that molecular weight may be increased by further polymerization of the oligomer. The intermediate is next further reacted for increasing the molecular weight of the PCCD. For the intermediate oligomer, the acid number which is determined by the number of acid end groups on the polymer chain is preferably less than about 10, preferable less than 6 meq/kg as determined from the titration method. Preferably the amount of catalyst present is less than about 200 ppm. Typically, catalyst may be present in a range from about 20 to about 300 ppm.

The starting CHDM has a trans-CHDM greater than the equilibrium amount and the reaction is carried out in an inert atmosphere under conditions to minimize trans to cis isomerization of said starting DMCD. These conditions require the starting DMCD and the starting CHDM to be present in a molar stoichiometric amount to a slight molar excess of DMCD so that the number of ester end groups such as acid or methyl carboxycyclohexanecarboxylate end groups and the number hydroxy end groups such as alkyoxycyclohexanealkyanol end groups are in substantially equal proportions for the low viscosity PCCD intermediate. The resulting low viscosity PCCD is then reacted to build molecular weight.

Also, in accordance with preferred conditions for preparing the PCCD oligomer, it is desirable to minimize the time period for forming the PCCD oligomer to prevent trans-to-cis isomerization. The utilization of a stoichiometric excess of diol or CHDM as a starting reactant slows the reaction rate and results in undesirable isomerization of DMCD. A slight stoichiometric excess of ester or DMCD is preferred to compensate for material imbalance created during the process, thereby enhancing the polymerization rate. Preferred starting temperatures of the reaction are from about 120 to about 140 degrees Centigrade. The preferred order for adding reactants comprises charging the CHDM to the reaction vessel or container, adding the DMCD in slight stoichiometric excess, and, next, adding the catalyst to the reaction vessel containing the starting reactants at the initial reaction temperature. This step is preferably conducted under an inert atmosphere, such as nitrogen, to form a distillate which is typically collected by condensation. The distillate by-product is, based on the starting material, typically an aliphatic alcohol, such as an alkyl alcohol of 1 to 12 carbon atoms. When CHDM is reacted with DMCD, methanol is removed during the ester interchange reaction as the reaction mixture is heated from the starting temperature to about 200 to about 250, preferably from 220 to 240 degrees Centigrade.

The PCCD acid interchange oligomer formed is further reacted to form a suitable low viscosity PCCD intermediate polymer that may be solid state polymerized to form a PCCD product that is suitable for use in polymer blends. The low viscosity PCCD intermediate is formed by increasing the molecular weight of the acid interchange oligomer under conditions of less than atmospheric pressure for removing distillate by-product. In the melt polycondensation stage for producing the intermediate oligomer, the temperature of the reaction mixture containing oligomers is increased to about 230 to 270 Centigrade, preferable from 250 to 265 degrees Centigrade. After a reaction time on the order about 15 minutes to about 40 minutes the reaction is halted to produce the low viscosity PCCD polymer having low viscosity from about 50 to about 800 poise. The low viscosity intermediate is preferably removed from reactor. Solid resin chips are then further polymerized in the solid state. For solid state polymerization, the polycondensation reaction is most preferably carried out at a temperature of about 206 degrees Centigrade to obtain the PCCD having the desired melting temperature and viscosity has previously described.

DETAILED DESCRIPTION

PCCD is an aliphatic polyester resin which has desirable properties for weatherable applications. The polyester is made by reacting dimethyl 1,4-cyclohexanedicarboxylate (DMCD) with 1,4-cyclohexanedimethanol (CHDM) in the presence of a catalyst (e.g. TPT). Preferably, control of stoichiometry during the formation of the oligomer intermediate is critical while minimizing isomerization of DMCD from trans to cis isomer.

Melt polymerization of 1,4-cyclohexanedimethanol (CHDM) and dimethyl trans-1,4-cyclohexanedicarboxylate (t-DMCD) in the presence of a catalyst such as titanium(IV) isopropoxide (TPT) results in the polyester resin PCCD:

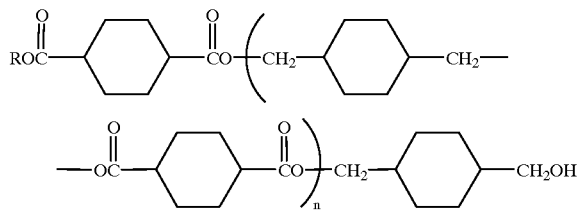

PCCD is an aliphatic polyester resin made from CHDM (diol), and t-DMCD (diester). In the present invention, n is preferably greater than about 70 and preferably from about 70 to about 150. R is an alkyl group of 1 to 6 carbon atoms. Preferably R is methyl or ethyl and most preferably methyl. The end groups consist essentially of 4-carboxycyclohexanecarboxylate group having the formula

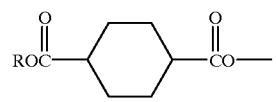

and 4-methanolcyclohexanemethylene group having the formula

Preferably the end groups are present in substantially equal proportions. The PCCD of the present invention is characterized by a relatively low acid content.

Both monomers are hydrogenation products of DMT as set forth in the example below wherein hydrogenation of the aromatic ring leads to two geometric isomers, the trans and cis isomers for each monomer.

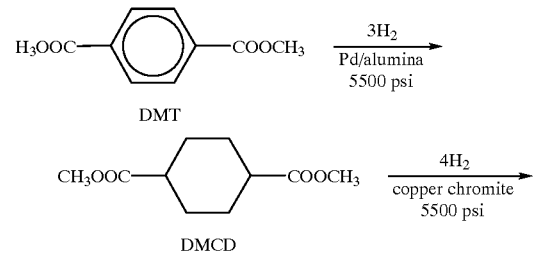

-continued

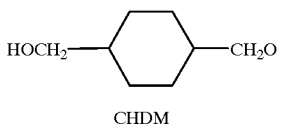

CHDM

The monomers have the following formulation.

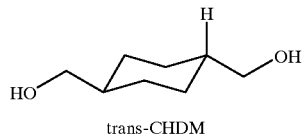

trans-CHDM

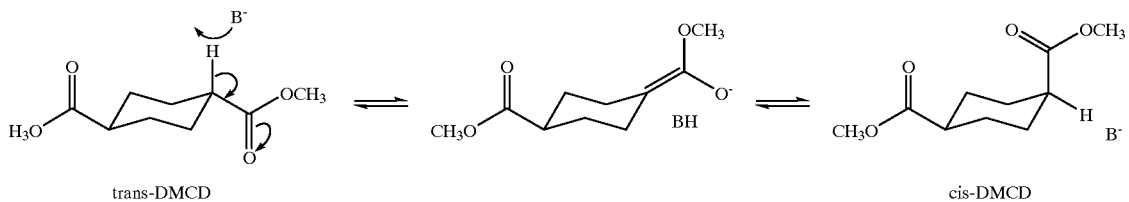

-continued

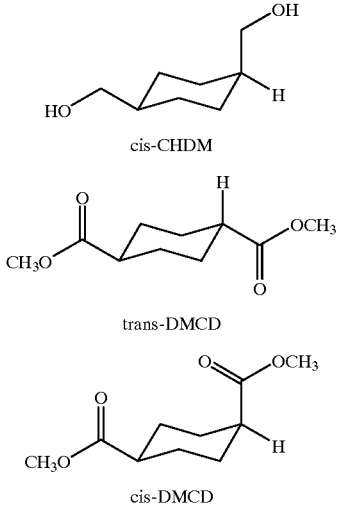

European 0 353 990 B1 (1994) to Y. Tateno describes a process to produce trans-enriched CHDM by selective distillation of trans-CHDM from cis/trans CHDM mixtures heated in the presence of base. CHDM is supplied with ~70–72% trans content, slightly below the thermodynamic equilibrium trans:cis ratio (~76% trans isomer). DMCD is available with >95% trans content. The thermodynamidc equilibrium for DMCD is at ~66% trans content. It is preferable to have trans-enriched CHDM and DMCD as starting components above the thermodynamidc equilibrium.

Upon hydrogenation of DMT, the two geometric isomers of CHDM and DMCD are obtained. When the starting DMCD comprises greater than about 90 percent trans content, the final FCCD comprises repeating units derived from DMCD having greater than about 85 percent trans content and preferably greater than about 90 percent trans content. Preferably, less than about 10 percent, more preferably less than about 5 percent of the DMCD undergoes isomerization.

The isomerization of DMCD is Lewis-acid (e.g. TPT) catalyzed and can occur during polymerization:

The trans:cis ratios are important since the $T_m$ of the polymer is related to the trans:cis ratio. According to the present invention, the rate of isomerization vs. polymerization is an important parameter that is desirably controlled during the process for the formation of PCCD.

According to the present invention, when making PCCD polyester by a melt polymerization process, it is desirable to adjust the process parameters to obtain a predetermined and optimized melt viscosity and melting point $T_m$. The reaction rate and the mass balance of the PCCD polymerization reaction are desirably controlled so as to reduce variability of the maximum melt viscosity and reduce polymer $T_m$ variability.

TGA results show that DMCD begins to vaporize at around 125° C., whereas CHDM begins to vaporize at 180° C. The variability in $T_m$ is due to trans to cis isomerization of the DMCD portions of the polymer backbone, which can be affected by longer reaction times. Higher trans content results in a higher $T_m$, higher degree of crystallinity, and faster crystallization rates.

Preferred reactor starting temperature was lowered to 130° C. CHDM was charged before t-DMCD. The vacuum rates for the polycondensation stage was ramped from an initial state to a higher vacuum. The stoichiometry was set at 1.005:1 diester:diol.

Table 2 below shows some properties of the PCCD polymer as a function of different melt viscosities and $T_m$'s.

TABLE 2

| Some PCCD Properties | | | |
|---|---|---|---|
| Batch | A | B | C |
| MV (poise) | 4325 | 1735 | 6049 |
| $T_m$ (° C.) | 220 | 207 | 211 |
| Diester trans % | 90% | 82% | 85% |
| Diol trans % | 71% | 72% | 72% |
| Absolute $M_w$ (daltons) | 40,000 | 36,000 | 45,000 |

TABLE 2-continued

Some PCCD Properties

| Batch | A | B | C |
|---|---|---|---|
| Absolute $M_n$ (daltons) | 23,000 | 18,000 | 26,000 |
| Polydispersity | 1.75 | 1.94 | 1.74 |
| Degree of Polymerization | 74 | 58 | 83 |

The two most critical factors governing PCCD polymerization and the resulting polymer properties (e.g. $T_m$) were found to be: 1) control of stoichiometry prior to charging the reactor and in the reactor during the polymerization, and 2) control of trans to cis isomerization of DMCD during the polymerization.

The rates of transesterification reactions will depend on the sterics and electronics of the endgroups. Cyclohexyl endgroups are very bulky, especially compared to the hydroxybutyl endgroups found in PBT. For commercially produced polyesters such as poly(ethylene terephthalate), PET, and poly(butylene terephthalate), PBT, high diol:diester ratios are preferred because they enhance oligomer formation rates without inhibiting polycondensation rates. For PCCD, however, high glycol to diester monomer ratios lead to very slow polycondensation rates and an undesirable decrease in trans-DMCD content.

Therefore, proper measurement and addition of monomers when charging a reactor is critically important. In addition, side reactions, physical properties, and chemical properties of the monomers can significantly influence the degree to which the polymer builds molecular weight. For PCCD, side reactions do not appear to influence the degree of polymerization. The stoichiometry and the physical properties of the monomers, on the other hand, have turned out to be critically important.

The variability in melting point is attributed to the trans isomer content of the CHDM and DMCD moieties in the polymer. Although CHDM does not isomerize during the polymerization, its initial trans content still effects the final melting temperature of the polymer. In contrast, DMCD does show trans to cis isomerization during the polymerization process, in spite of its high initial trans content. The trans:cis ratios may be determined by C-13 NMR, and can be determined using a 300 MHz FT-NMR spectrometer.

Although the PCCD process is nominally run in an EI stage followed by a polycondensation stage, the polycondensation transesterification rates for PCCD appear to be extremely slow. The glycol component in PCCD is CHDM, which has two characteristics that make the polycondensation reaction difficult. First, CHDM has low volatility, making it difficult to remove from the system. Second, CHDM is very bulky and creates a large amount of steric hindrance that inhibits transesterification once the CHDM is attached to a t-DMCD carboxyl group. In other words, CHDM endgroups act like chain-stoppers due to slow transesterification kinetics. Therefore, in order to obtain high molecular weight PCCD, the ester interchange reactions are critical to building molecular weight. The result is that a stoichiometrically controlled ratio of diester to diol is required in order to obtain equal numbers of hydroxyl and ester endgroups and maximize build through ester interchange.

The preferred ratio of diester:diol (DMCD:CHDM) is 0.98 to 1.02; more preferred is 0.995 to 1.005. It is contemplated that a slight excess of diester DMCD may be added to compensate for volatility of DMCD during the reaction. Typically, such excess of DMCD utilized is less than one percent but the excess may vary from reactor to reactor.

LAB REACTION EXAMPLE

A typical laboratory scale procedure follows. A 500 ml 3-neck flask is charged with t-DMCD (100.00 g) and CHDM (71.66 g), a 1.005:1 diester:diol mole ratio. The flask is fitted with a mechanical stirrer, thermometer, and Dean-Stark trap with condenser, and then placed in an oil bath heated to 170° C. When the reaction temperature reaches 155° C., tetraisopropyltitanate (TPT, 0.17 ml, 200 ppm based on theoretical polymer yield) is added to the flask and the timer is started. Methanol begins to distill after about 2 minutes. The oil temperature is gradually heated to 230° C. over a 1 hr period, and then the Dean-Stark trap is replaced with a vacuum distillation head. At the end of the EI stage, a total of ~34 ml of distillate was collected (theoretical MeOH yield is 40.25 ml), and the reaction temperature was 212° C.

After attaching the vacuum apparatus to the reaction flask, vacuum is slowly and carefully applied to avoid foaming and entrainment of oligomers in the distillation head. A melt viscosity of >4500 poise was achieved in 2–3 hrs. time under vacuum. Table 3 shows several examples where the melting points range from 208 to 223 degrees Centigrade.

In the synthesis of the low viscosity polymer a similar process was followed in the EI phase. During the polycondensation phase for the formation of the intermediate low viscosity PCCD polymer from the acid interchange oligomer, the temperature was raised to about 260 C and vacuum applied for about 15–20 minutes. The reaction time is sufficiently long for the desired low melt viscosity to be achieved. The reaction is stopped by lowering the temperature. Lowering the reaction temperature to a suitable temperature for halting the reaction is preferably within the 15 to 20 minute time fame when the reaction temperature is 260° C. A melt viscosity of about 200–600 poise was achieved. These resins were subsequently solid state polymerized up to the high melt viscosities at temperatures ranging from 190 to 206 degrees C. These polymers had higher melting points as shown in Table 4 below.

Lower temperatures require longer time periods and higher temperatures require shorter reaction time periods to produce the desired low viscosity polymer.

TABLE 3

Examples

| Example | DMCD:CHDM | [Ti] (ppm) | Final Temp. (° C.) | Total Time (hrs) | MV (poise) | $T_m$ |
|---|---|---|---|---|---|---|
| 1 | 0.962 | 100 | 265 | 5:30 | 1621 | 223 |
| 2 | 0.962 | 200 | 265 | 9:15 | 5359 | 211 |
| 3 | 0.977 | 200 | 266 | 4:59 | 1208 | 223 |
| 4 | 0.990 | 200 | 268 | 6:25 | 4329 | 208 |
| 5 | 0.991 | 200 | 266 | 6:39 | 5487 | 207 |
| 6 | 0.995 | 200 | 265 | 5:30 | 950 | 222 |
| 7 | 0.995 | 200 | 270 | 5:42 | 1518 | 208 |
| 8 | 1.004 | 175 | 264 | 3:50 | 5769 | 223 |
| 9 | 1.004 | 175 | 265 | 3:50 | 6035 | 223 |
| 10 | 1.005 | 200 | 265 | 2:15 | 5359 | 219 |
| 11 | 1.005 | 200 | 265 | 3:45 | 5430 | 221 |
| 12 | 1.005 | 200 | 265 | 3:45 | 6133 | 220 |
| 13 | 1.005 | 200 | 265 | 4:30 | 6148 | 216 |

TABLE 4

| Example | DMCD:CHDM | Ti (ppm) | MV from melt (Poise) | Total melt Time hrs. | SSP Temp | SSP time (hrs) | SSP MV (poise) | $T_m$ |
|---|---|---|---|---|---|---|---|---|
| A | .995 | 200 | 208 | 1:39 | 205 | 22.5 | 15450 | 228 |
| B | .995 | 200 | 208 | 1:39 | 190 | 23 | 2086 | 234 |
| C | .995 | 200 | 527 | 1:30 | 206 | 23.5 | 20866 | 225 |

The procedures used for measuring melt viscosity (MV) and polymer melting point ($T_m$) follow. A Perkin-Elmer DSC-7 with Pyris software was used to measure melt temperatures. The typical DSC sample size was 4–6 mg. The DSC heating and cooling rates are 20° C./min, and the melting temperatures are taken from the endotherm peak maximum of the second heating cycle. In cases where double melting peaks are seen, the peak maximum of the highest temperature peak is reported as the $T_m$.

The MV measurements were run on a Gottfert instrument at 250° C. with a 21.6 Kg weight. The orifice used had dimensions of 0.615" length×0.042" diameter. The sample size was 5 grams, and the sample was dried at 150° C. for 1 hr.

Carboxyl end groups (COOH) were determined by a general equivalence-point titration. A solid sample is dissolved at reflux in a solution of ortho-cresol and methylene chloride. After cooling to room temperature, the carboxyl end groups are titrated with 0.01 N-tetrabutylammonium hydroxide/2,2,2-trifluoroethanol. Carboxyl endgroups are reported as millimole equivalents per kilogram.

When the mixture of isomers or more than one diacid is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most preferred chemical equivalent comprises the dimethyl ester of the acid, particularly dimethyl trans-1,4-cyclohexanedicarboxylate.

The reaction is generally run in the presence of a suitable catalyst such as a tetrakis (2-ethyl hexyl) titanate, in a suitable amount, typically about 50 to 500 ppm of titanium based upon the final product. Preferably less than 200 ppm. Typical catalysts incuding transitions metals, other alternative catalysts and co-catalysts as known in the art may be utilized. Metals such as Zr, Sn, Ge, Sb, Al are typical catalysts. The catalyst level as referred to herein is based on the ppm of catalyst per theoretical polymer weight, such as 200 ppm titanium per weight polymer. Typically, the amount of catalyst present is less than 500 ppm.

The color of the PCCD is typically a natural color and may have a slight pale yellow coloration. Optical clarity is preferred. Preferably the preferred color as measured by a color clarity index b* is less than about 8. Additionally, additives such as stabilizers may be added to the reaction mixture to stabilize the mixture. Preferably such additives do not contribute to a yellowing of the resulting PCCD. Preferred additives are phosphite stabilizers such as disteryl pentaerythritol diphosphite, diisooctyl phosphite, distearyl phosphite, triphenyl phosphite, diphenyl isodecyl phosphite, and distearyl pentaerythritol diphosphite. The phosphites may be of the formula:

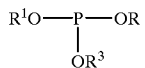

where $R^1$, $R^2$ and $R^3$ are independently selected from the group consisting of hydrogen, alkyl and aryl with the proviso that at least one of $R^1$, $R^2$ and $R^3$ is hydrogen or alkyl. Phosphites are typically utilized in an amount equal to about 0.01 to about 2 parts by weight per 100 parts by weight resin (phr). Amounts of about 0.01 to about 1 phr are more preferred, although most compositions will contain about 0.025 phr or more.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

What is claimed is:

1. A process for producing PCCD polyester of the formula

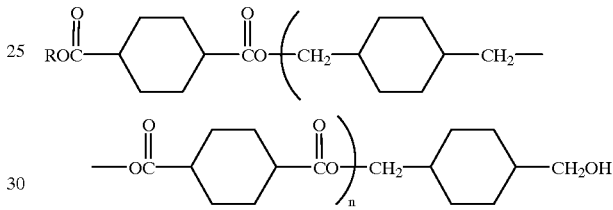

from a starting CHDM and a starting DMCD by reacting said CHDM and said DMCD in the presence of a catalyst to produce an aliphatic alcohol and an acid interchange oligomer, heating said acid interchange oligomer to form an intermediate low viscosity PCCD polymer having a viscosity from about 50 to about 1000 poise, and reacting the intermediate PCCD oligomer by solid state polymerization for increasing the molecular weight of said PCCD at a temperature from 180 to about 210 degrees Centigrade to form a PCCD having melting temperature of about 225 to about 234 degrees Centigrade and a viscosity from about 2,000 to about 20,000 poise.

2. A process for producing PCCD polyester according to claim 1 wherein said intermediate low viscosity PCCD polymer has a viscosity from about 200 to about 600 poise.

3. A process for producing PCCD polyester according to claim 2 wherein the reaction of said CHDM and said DMCD is carried out at a molar stoichiometric amount comprising a small excess of diester DMCD to compensate for volatility of DMCD during said reaction.

4. A process for producing PCCD polyester according to claim 3 wherein said molar stoichiometric amount is in a ratio of DMCD to CHDM from about 0.98 to about 1.02.

5. A process for producing PCCD according to claim 3 polyester comprising minimizing the time period to prevent trans to cis isomerization of said DMCD.

6. A process for producing PCCD polyester according to claim 3 comprising carrying out the reaction or CHDM and DMCD from a starting temperature from about 120 to about 140 degrees Centigrade.

7. A process for producing PCCD polyester according to claim 6 wherein said molar stoichiometric amount is in a ratio of DMCD to CHDM from about 0.995 to about 1.005.

8. A process for producing PCCD polyester according to claim 3 comprising carrying out the reaction at a final reaction temperature for forming the acid interchange oligomer of from about 200 to about 270 degrees Centigrade.

9. A process for producing PCCD polyester according to claim 8 comprising adding reactants and catalyst according to the order of charging the CHDM to the reaction vessel or container, adding the DMCD in slight stoichiometric excess, and, next, adding the catalyst to the reaction vessel containing the starting reactants at the initial reaction temperature.

10. A process for producing PCCD polyester according to claim 3 comprising the step of further reacting the acid interchange oligomer for forming a low viscosity PCCD intermediate, is carried out under reaction conditions to build the molecular weight of PCCD and obtain a PCCD product that is suitable for solid state polymerization.

11. A process for producing PCCD polyester according to claim 3 comprising increasing the molecular weight of said acid interchange PCCD by reacting said acid interchange PCCD under conditions of less than atmospheric pressure for removing distillate by-product and for a suitable period of time to permit the formation of said intermediate low viscosity PCCD polymer.

12. A process for producing PCCD polyester according to claim 11 wherein the temperature of the reaction mixture containing said acid interchange PCCD is gradually increased to a temperature of about 245–270 degrees Centigrade to produce said low viscosity PCCD polymer.

13. A process for producing PCCD polyester according to claim 12 comprising increasing the molecular weight of said low viscosity PCCD intermediate by solid state polymerization of said PCCD intermediate.

14. A process for producing PCCD polyester according to claim 13 wherein the repeat unit derived from DMCD has a trans-cis ratio is greater than r about 6 to 1 in the polymer.

15. A process for producing PCCD polyester according to claim 14 the wherein the repeat unit derived from DMCD has a trans-cis ratio is greater than about 8 to 1.

16. A process for producing PCCD polyester according to claim 15 wherein less than about 10 percent of the repeat unit derived from DMCD is converted from trans to cis isomer during said reaction.

17. A process for producing PCCD polyester according to claim 16 wherein less than about 5 percent the repeat unit derived from DMCD is converted to trans to cis during said reaction.

18. A process for producing PCCD polyester according to claim 17 wherein a stabilizer is present in said reaction mixture.

19. A process for producing PCCD polyester according to claim 18 wherein said stabilizer comprises a phosphite stabilizer.

* * * * *